Feb. 7, 1933.  W. GUMPRICH ET AL  1,896,304

MEAT CLAMP

Filed July 30, 1929

Inventor
Charles H. Good
William Gumprich
By their Attorney
W. M. Wilson

Patented Feb. 7, 1933

1,896,304

UNITED STATES PATENT OFFICE

WILLIAM GUMPRICH, OF DAYTON, OHIO, AND CHARLES H. GOOD, OF HAMILTON, ONTARIO, CANADA, ASSIGNORS TO DAYTON SCALE COMPANY, OF DAYTON, OHIO, A CORPORATION OF NEW JERSEY

MEAT CLAMP

Application filed July 30, 1929. Serial No. 382,212.

The present invention relates to a clamping device for slicing machines such as meat slicers and has for its main object the provision of new and simple means for actuating such a clamping device.

Another object of the invention is to provide a gear mechanism for moving one clamping element of such a device relatively to another clamping element.

A further object is to provide latching means for automatically latching the clamping device in any adjusted position said latching means serving also to actuate the aforesaid gearing mechanism.

Other objects and advantages will be hereinafter set forth in the accompanying specification and claims and illustrated in the drawing which shows what is considered to be a preferred embodiment of the invention.

Figure 1:
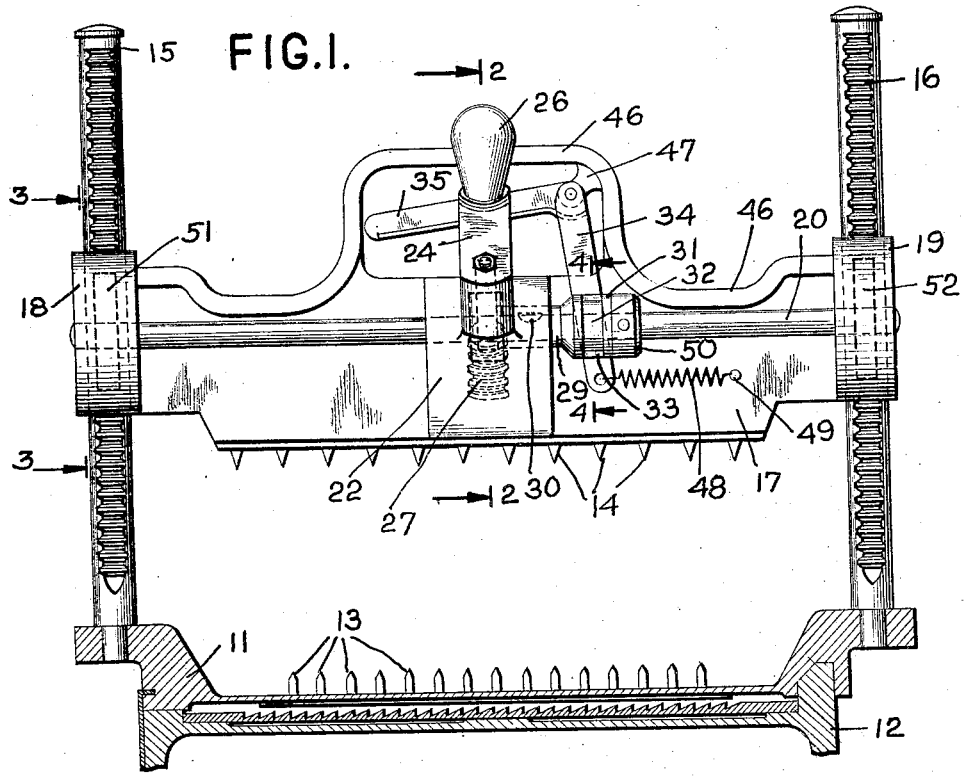
Fig. 1 shows a front view of the meat clamp and its attachment to the posts of the meat plate of a slicing machine.
Figures 2, 3, 4:
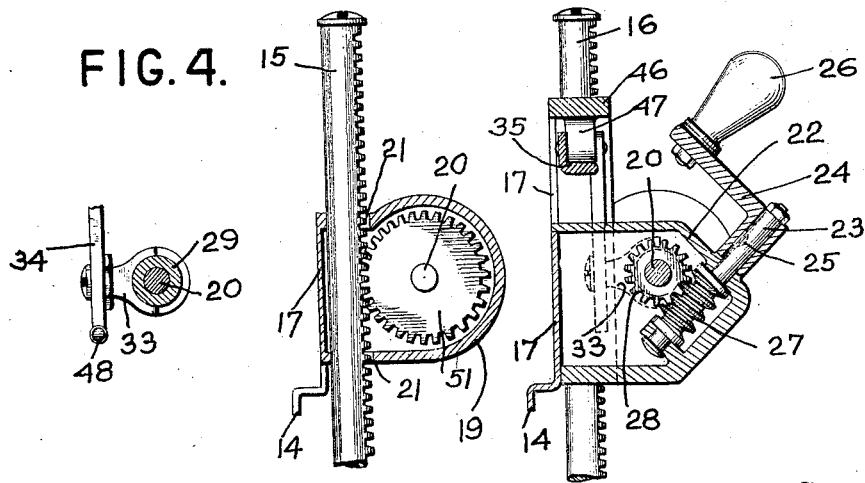
Fig. 2 is a sectional view on line 2—2 of Fig. 1.
Fig. 3 is a sectional view on line 3—3 of Fig. 1.
Fig. 4 is a sectional view on line 4—4 of Fig. 1.

In Fig. 1 the meat plate of a well known type of meat slicer is designated at 11. Plate 11 is slidably mounted upon a table 12 and a suitable feeding mechanism of any known construction feeds the plate 11 in step by step movement towards a rotating knife while the table reciprocates to bring the meat alternately into and out of cutting position.

It will be understood that plate 11 is moved one step forward upon table 12 when the same is in non-cutting position and when the same moves towards the knife edge a slice will be cut from the meat which has been advanced towards the plane of the knife.

Meat plate 11 is provided with a plurality of teeth 13 and the meat clamp has a plurality of teeth 14. These teeth serve to grip the meat firmly and hold it in position during cutting operations. To the meat plate 11 are fast two posts 15 and 16 having rack teeth cut therein which carry the meat clamp and along which the clamp is movable up and down to enable clamping of pieces of meat of different size.

The meat clamp includes a plate 17 having on each end a casing 18 and 19 respectively the side walls of which support a shaft 20 which extends along the plate 17 from the outer side wall of casing 18 to the outer side wall of casing 19, the shaft carries a toothed wheel at each end designated at 51 and 52 respectively, said wheels being in mesh with the rack teeth in posts 15 and 16 and being located in the aforesaid casings 18 and 19 respectively. The casings 18 and 19 are provided with holes 21 through which pass the posts 15 and 16 respectively. To the middle portion of plate 17 is attached a casing 22 through which passes shaft 20. The casing 22 carries a shaft 23 having a crank 24 keyed to it at 25. Crank 24 has a handle 26 for rotating shaft 23. This shaft is provided with a worm 27 adapted to engage a worm pinion 28 fast to a sleeve 29 splined to shaft 20. Sleeve 29, then, always turns with shaft 20 but may be shifted longitudinally thereon.

A collar 31 is provided on one end of sleeve 29 which collar has a circumferential groove 32 into which passes a bifurcated element 33 adapted to move sleeve 29 in axial direction. Bifurcated element 33 is loosely mounted in lever 34 which is connected with a finger piece 35. A bar 46 at the top of plate 17 forms the handle of the meat clamp. In one corner of this handle is provided a stud 47 carrying pivotally the lever unit 34, 35. To the lower end of lever 34 is fastened a spring 48 which is attached at its opposite end at 49 to plate 17. This spring normally holds the parts in the position shown in Fig. 1 where the collar 31 is in engagement with a stop element 50 fastened to shaft 20. In this position the pinion 28 is in engagement with worm 27. When the operator turns handle 26 the worm 27 will rotate pinion 28 and consequently shaft 20 and since wheels 51, 52 mesh with the racks of posts 15, 16 the turning of handle 26 will cause either an ascending or descending movement of the meat clamp depending on the turning direction of said handle. This operation is preferably used for a fine adjustment of the meat clamp or for moving the clamp positively downward with a comparatively great force towards the meat beneath the clamp. If, however, the clamp is to be only approximately adjusted according to a certain thickness of a piece of meat the operator when gripping handle 46 lifts arms 35, this causes movement of lever 34 (Fig. 1) to the left against the tension of spring 48 and consequently the bifurcation 33 will move sleeve 29 to the left thus disengaging pinion 28 from worm 27. The meat clamp therefore may be freely moved up or down and the meshing of wheels 51, 52 with posts 15, 16 will not affect this movement.

When in the desired position lever 35 is released pinion 28 will engage worm 27 and through this coaction the clamp will be automatically held in the adjusted position. If desired it may then be moved up or down towards the meat by turning handle 26 as has been already described.

It will be noted that the worm and pinion in addition to being a feeding mechanism forms a lock for the meat clamp so that it will remain in any position to which it may be moved.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention therefore to be limited only as indicated by the scope of the following claims:

1. In a clamping device of the class described, a movable clamping element, a supporting post for the same on which said element is movable, a rack on said post, a pinion on said element with means for holding it in mesh with the rack, a worm meshing with a worm wheel for driving said pinion and means for releasing said worm from its wheel to permit movement of the clamping element independently of the worm drive.

2. In a clamping device of the class described, a movable clamping element, a post on which said element is movable, feeding mechanism including means on said element cooperating with the post for feeding the element along the post, a handle on said element, and means for releasing the feeding mechanism to permit free movement of the element along the post and a lever mounted on said handle for controlling said releasing means.

3. In a clamping device of the class described, a movable clamping element, a post on which said element is movable, feeding mechanism including means on said element cooperating with the post for feeding the element along the post, a looped handle on said element, means for releasing the feeding mechanism to permit free movement of the element along the post and a lever mounted within the loop of said handle for controlling said releasing means.

4. In a clamping device of the class described, a movable clamping element, a post having a rack thereon on which said element is movable, a pinion on said element with means for holding it in mesh with said rack, a driving shaft for the pinion and gears for driving said shaft, means for shifting said gears out of mesh, a handle on said element and a shifting lever controlling said gear shifting mechanism pivoted on said handle whereby the handle may be gripped to move the element and the gears simultaneously released.

In testimony whereof we hereto affix our signatures.

CHARLES H. GOOD.
WM. GUMPRICH.